US006782609B1

(12) United States Patent
Beggs

(10) Patent No.: US 6,782,609 B1
(45) Date of Patent: Aug. 31, 2004

(54) CONNECTING ROD CRACKING APPARATUS

(75) Inventor: Orrin P. Beggs, Belvidere, IL (US)

(73) Assignee: Unova IP Corp., Woodland Hills, CA (US)

(*) Notice: Subject to any disclaimer, the term of this patent is extended or adjusted under 35 U.S.C. 154(b) by 59 days.

(21) Appl. No.: 10/217,121

(22) Filed: Aug. 12, 2002

(51) Int. Cl.[7] ............................................. B23P 19/00
(52) U.S. Cl. .................... 29/791; 29/822; 29/888.09; 225/100
(58) Field of Search ......................... 29/888.09, 791, 29/792, 822, 237; 225/98, 100, 103, 104

(56) References Cited

U.S. PATENT DOCUMENTS

| 4,569,109 A | 2/1986 | Fetouh |
| 4,684,267 A | 8/1987 | Fetouh |
| 4,754,906 A | 7/1988 | Brovold |
| 4,768,694 A | 9/1988 | Fabris et al. |
| 4,860,419 A | 8/1989 | Hekman |
| 4,936,163 A | 6/1990 | Hoag et al. |
| 4,970,783 A | 11/1990 | Olaniran et al. |
| 4,993,134 A | 2/1991 | Hoag et al. |
| 5,105,538 A | 4/1992 | Hoag et al. |
| 5,109,605 A | 5/1992 | Hoag et al. |
| 5,115,564 A | 5/1992 | Miessen et al. |
| 5,131,577 A | 7/1992 | Hoag et al. |
| 5,169,046 A | 12/1992 | Miessen et al. |
| 5,274,919 A | 1/1994 | Becker |
| 5,283,938 A | 2/1994 | Jones |
| 5,320,265 A | 6/1994 | Becker |
| 5,353,500 A | 10/1994 | Hoag et al. |
| 5,503,317 A | 4/1996 | Jones et al. |
| 5,568,891 A | 10/1996 | Hoag et al. |
| 5,946,790 A * | 9/1999 | Graham et al. ........... 29/888.09 |
| 6,125,536 A | 10/2000 | Spurny |
| 6,536,642 B1 * | 3/2003 | Cavallo et al. ........... 29/888.09 |

* cited by examiner

Primary Examiner—David P. Bryant
(74) Attorney, Agent, or Firm—Reising, Ethington, Barnes, Kisselle, P.P.C.

(57) ABSTRACT

A connecting rod is cracked by mounting it on a fixture having a split mandrel and driving a pair of opposed wedges between the mandrel halves. The fixture is mounted on a support and is transported by a conveyor through a series of stations where the rod is split, separated into two pieces, the crack zone is cleaned, and the pieces are reunited along the crack lines. The use of two opposed wedges cancels out the horizontal forces of the wedges and results in a vertical force that cracks the rod. The fixture floats relative to the support allowing the connecting rod to be centered relative to the wedges. A break limiter limits the displacement of the first side of the rod to crack to prevent distortion of the second side before it cracks. In the event the fixture malfunctions, the entire fixture is removed from the conveyor and replaced by another fixture, thus reducing downtime.

20 Claims, 6 Drawing Sheets

CONNECTING ROD CRACKING APPARATUS

FIELD OF THE INVENTION

The invention relates to an apparatus and method of cracking connecting rods used in internal combustion engines in which the rods are supported on a fixture mounted on a conveyor that transports the rods through a plurality of stations where each rod is split into a body and cap, the crack zone is cleaned, and the body and cap are reunited and bolted together before being removed from the fixture.

BACKGROUND OF THE INVENTION

The connecting rod in an internal combustion engine couples the crankshaft to a piston. The small end of the connecting rod has a small bore that is coupled to the wrist pin on a piston and big end of the connecting rod has a big bore that is coupled to the eccentric pin on a crankshaft. Because of the physical construction of the crankshaft, the big end of the connecting rod has to be separated into two pieces in order to be mounted on the pin. In the past, the normal practice was to initially mold and machine the connecting rod in two pieces that would then bolted together on the crankshaft pin.

As engine manufacturers required greater precision, it was found that molding and machining the connecting rod in two pieces and then assembling the pieces together would not give as perfect a fit on the crankpin as could be achieved if the rod was initially cast in one piece and then split or cracked at the centerline of the big bore. The two pieces will fit perfectly together because the irregularities of the split match up to one another when the two pieces are reassembled.

SUMMARY AND OBJECTS OF THE INVENTION

According to the invention, the big end of a connecting rod is mounted on a split mandrel that is carried by a fixture. The fixture is transported through several operations by means of a conveyance system, and the conveyance system transports a plurality of similarly equipped fixtures. The big end of the connecting rod is split or cracked using two opposing wedges that are driven into a passageway formed between the mandrel halves. The two opposing wedges create equal and opposite horizontal forces and accumulative vertical forces. The horizontal forces cancel each other out, and the vertical forces separate the split mandrel along a line that is parallel to the plane of the connecting rod and perpendicular to the axis of the bore in the big end. A low pressure is first used to push the two wedges toward each other to take out any clearance between the components. A high pressure is then applied to the wedges to rapidly separate the connecting rod cap from the connecting rod body. Means are provided to limit the separation between the connecting rod cap and body after one side of the rod has cracked in order to limit the distortion of the uncracked side before it also cracks. Once both sides of the rod have cracked and the connecting rod cap is separated from the body, the gap between the cap and the body is increased and held open until the crack zone can be cleaned. After cleaning, the connecting rod cap and body are bolted together and are then removed from the fixture.

It is accordingly an object of the invention to provide a connecting rod cracking apparatus in which the connecting rod is mounted on a fixture that circulates through several operations by means of a conveyance system.

It is another object of the invention to provide a connecting rod cracking apparatus in which the connecting rod is cracked by a single force acting in a single direction by using two opposing wedges that are driven into a passageway formed between the halves of a split mandrel.

It is another object of the invention to provide a connecting rod cracking apparatus in which means are provided to limit the separation between the connecting rod cap and body after one side of the rod has cracked in order to limit bending distortion of the uncracked side.

It is another object of the invention to provide a connecting rod cracking apparatus in which means are provided to separate the cap from the body after the cracking has occurred so that crack debris can be removed from the crack zone before the cap and the body are reunited.

It is another object of the invention to provide a connecting rod cracking apparatus in which the means to crack the cap from the body travels with the fixture so that only external forces are needed at the cracking station to cause the rod to crack.

These and other objects of the invention will become apparent from the following detailed description in which reference numerals used throughout the description correspond to numerals found on the drawing figures.

DESCRIPTION OF THE PREFERRED EMBODIMENT

Figure 1:
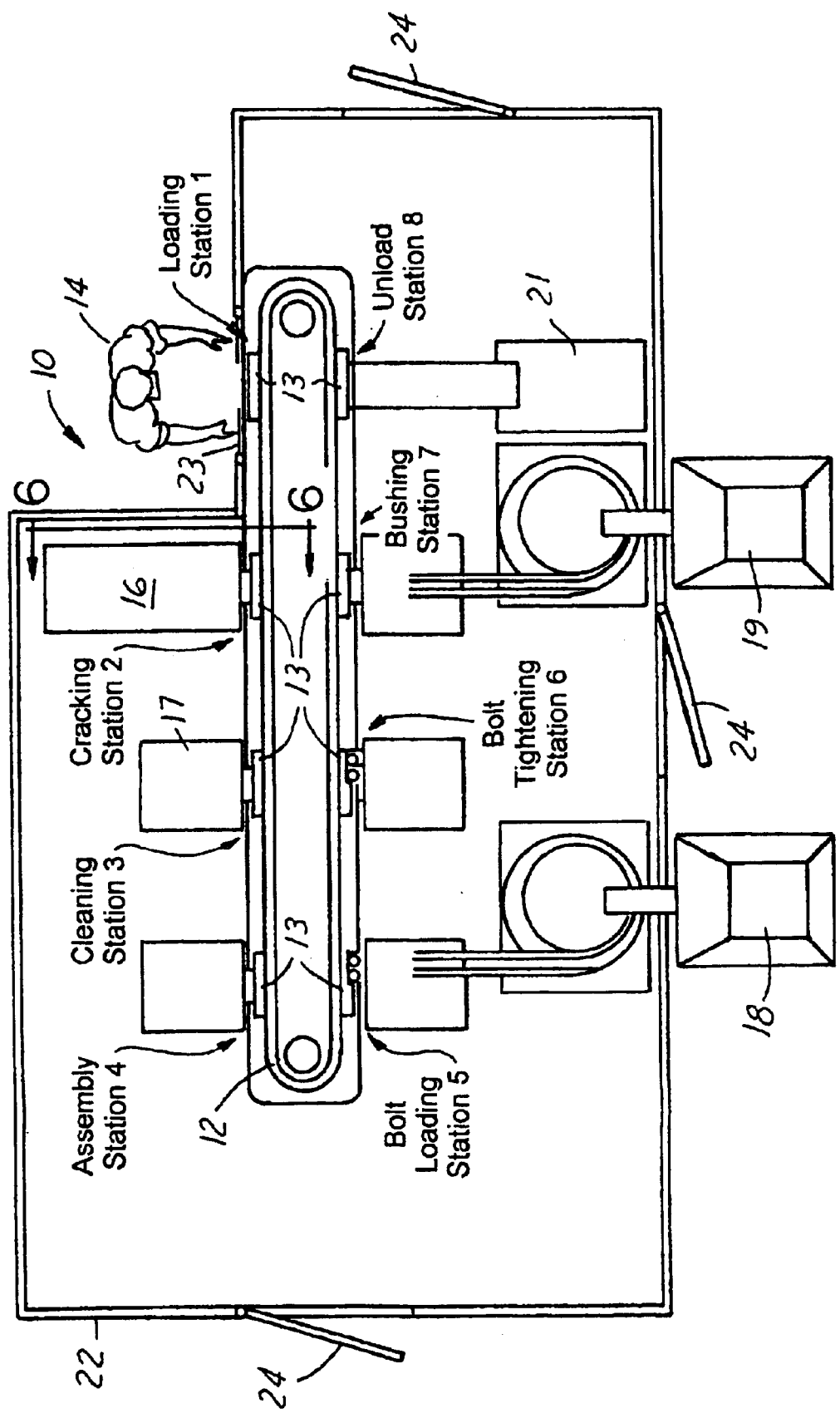
FIG. 1 is a plan view of a connecting rod cracking apparatus with a conveyance mechanism according to the invention.

FIG. 1 shows a plan view of a connecting rod cracking and assembly installation 10 according to the invention. A precision link transfer conveyor 12 or other suitable means of conveyance is laid out on an elongated oval path. Eight connecting rod cracking fixtures 13 are mounted at uniform intervals along the length of the conveyor 12. The conveyor is driven so that each of the fixtures 13 stop in turn at eight stations spaced around the elongated oval path. The use of the traveling fixture 13 through the several stations eliminates handling the connecting rod during any secondary operations that may be performed, and in the event a fixture is in need of repair, the entire fixture can be removed from the conveyor 12 and another fixture mounted on the conveyor 12 in its place, thus minimizing downtime. At the Loading Station 1, connecting rods are placed by an operator 14 over a split mandrel carried by a fixture 13, or alternatively, automation may be provided to load connecting rods onto the fixtures. At the Cracking Station 2, a press ram mechanism 16 is used to separate the connecting rod cap from the connecting rod body. At the Cleaning Station 3, the connecting rod cap is lifted 1–2 inches relative to the connecting rod body, and a compressed air and vacuum source 17 is used to clean debris caused by the cracking operation in the crack zone between the body and the cap before the body and the cap are reunited.

At the Assembly Station 4, a rapping force is applied to the cap to seat the cap to the connecting rod body. At the Bolt Loading Station 5, bolts from a bolt hopper 18 are loaded into the cap and run down to loosely secure the cap to the body. At the Bolt Tightening Station 6, the bolts are tightened to the specified torque so that the bore can be reamed to the correct size after the connecting rod is removed from the transfer conveyor 12.

At the Bushing Station 7, wrist pin bushings from a bushing hopper 19 are oriented and pressed into the lower end of the connecting rod. At the Unload Station 8 the completed connecting rod assembly is removed from the transfer conveyor and placed into a completed assembly tray 21. The entire connecting rod cracking and assembly apparatus 10 can be surrounded by a safety enclosure 22. An access opening 23 is provided at the Loading Station 1 to allow the operator 14 to load uncracked connecting rods onto the fixtures 13. Access doors 24 allow personnel to enter the enclosure 22 in order to maintain and repair the apparatus. It will be understood that the operations performed at Stations 4–8 are secondary operations that are not essential to the invention, but are included here in order to provide a full and complete description of the environment in which the invention may be utilized.

FIGS. 2–4A show detail views of the fixture 13 used to transport and crack the connecting rods. Each fixture is supported on pins 28 mounted on a base plate 26 that is mounted to the conveyor 12. The pins 28 allow the fixture to float forward and backward relative to the base plate 26 during the cracking operation as more fully described below. The fixture comprises a support plate 27 and a slide plate 29 that is mounted to the support plate 27 by a pair of side retainers 31. The side retainers 31 allow the slide plate 29 to slide vertically relative to the support plate 27.

A split mandrel 32 comprises an upper portion 33 that is rigidly attached to the slide plate 29, and a lower portion 34 that is rigidly attached to the support plate 27. The split mandrel 32 is dimensioned to fit within the big bore 36 of a connecting rod 35. A flat 39 is formed on the top of the upper mandrel portion 33 and a similar flat 40 is formed on the bottom of the lower mandrel portion 34. The flats 39 and 40 insure that each mandrel portion contacts the bore of the connecting rod at two places to distribute the cracking forces applied to the bore. This distribution of force limits distortion of the big bore 36 caused by the separating force of the split mandrel 32.

A pair of spring loaded ball plungers 41 mounted on blocks 42 on the support plate 27 protrude through a cutout 43 in the slide plate 29 and bias the connecting rod body 37 against the lower mandrel 34. A spring loaded pressure cap 95 is mounted on the end of a shoulder screw 96 that is slideably received by a pressure cap mount 97. A spring 98 biases the pressure cap 95 against the connecting rod cap 38. At the Loading Station 1, the shoulder screw 96 is engaged by a lifting device (not shown) that raises the shoulder screw and the pressure cap 95 to allow a connecting rod to be loaded onto the split mandrel 32. The lifting device used at Station 1 may be similar to the lifting device 99 used at the Cleaning Station 3 to engage the shoulder screw 96 in order to raise the upper mandrel 33 and the connecting rod cap 38 as more fully described below.

Two lateral motion restrictors 45 are mounted on a spacer block 46 that is attached to the support plate 27. The lateral motion restrictors 45 engage the small end 47 of the connecting rod 35 to prevent the small end from swinging. Two springs 48 are attached to tabs 49 on the lower edge of the slide plate 29 to pull the side plate down in order to bias the pressure cap 95 against the connecting rod cap 38.

Figure 2:
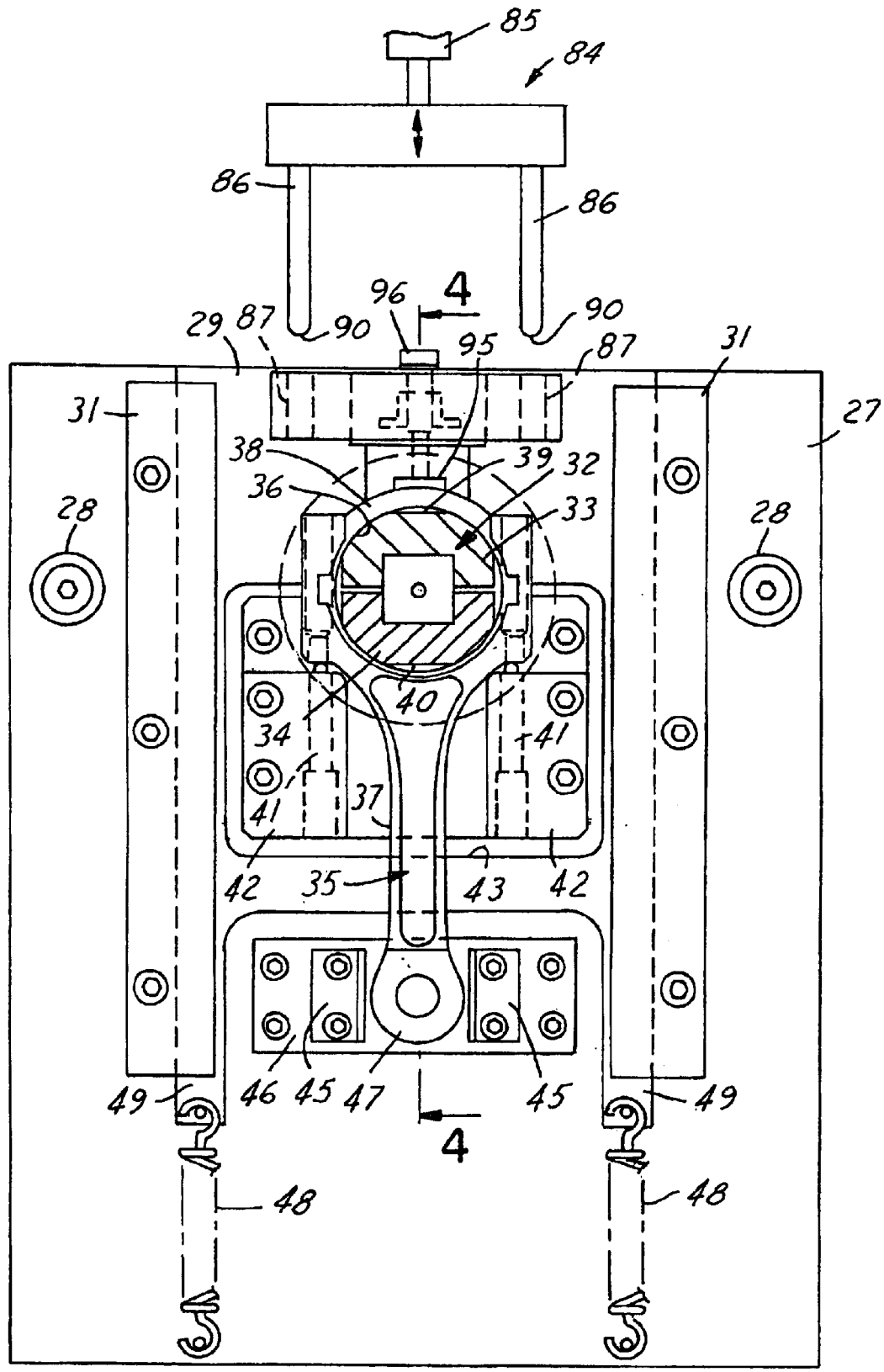
FIG. 2 is a front view of a fixture with a connecting rod mounted thereon and a break limiter in the raised position.
Figure 2A:
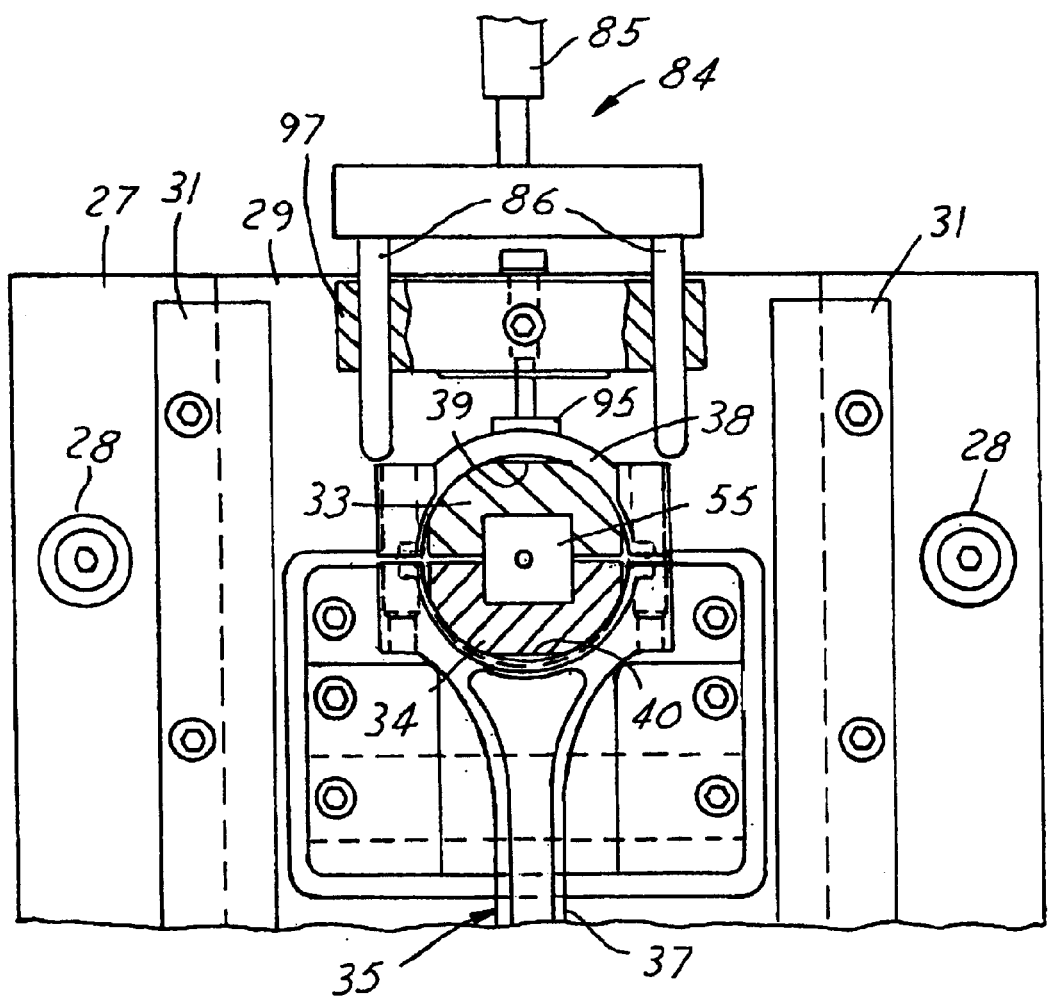
FIG. 2A is a front view of a fixture with a connecting rod mounted thereon and a break limiter in the lowered position.
Figure 3:
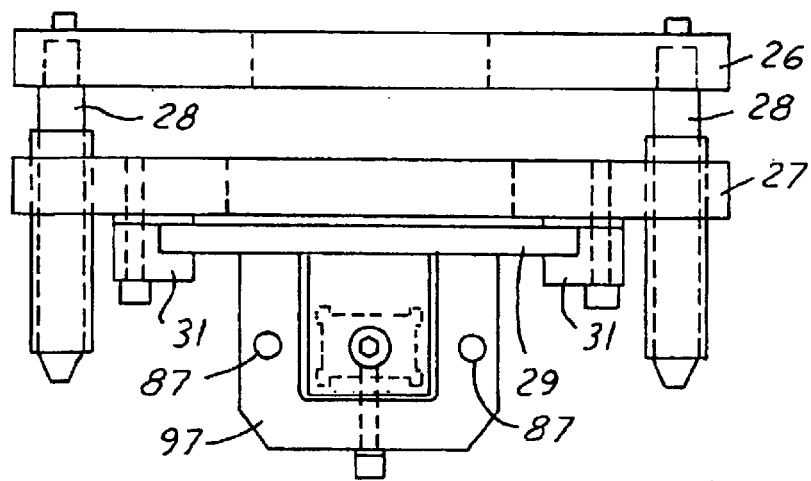
FIG. 3 is a top view of the fixture and connecting rod of FIG. 2.
Figure 4:
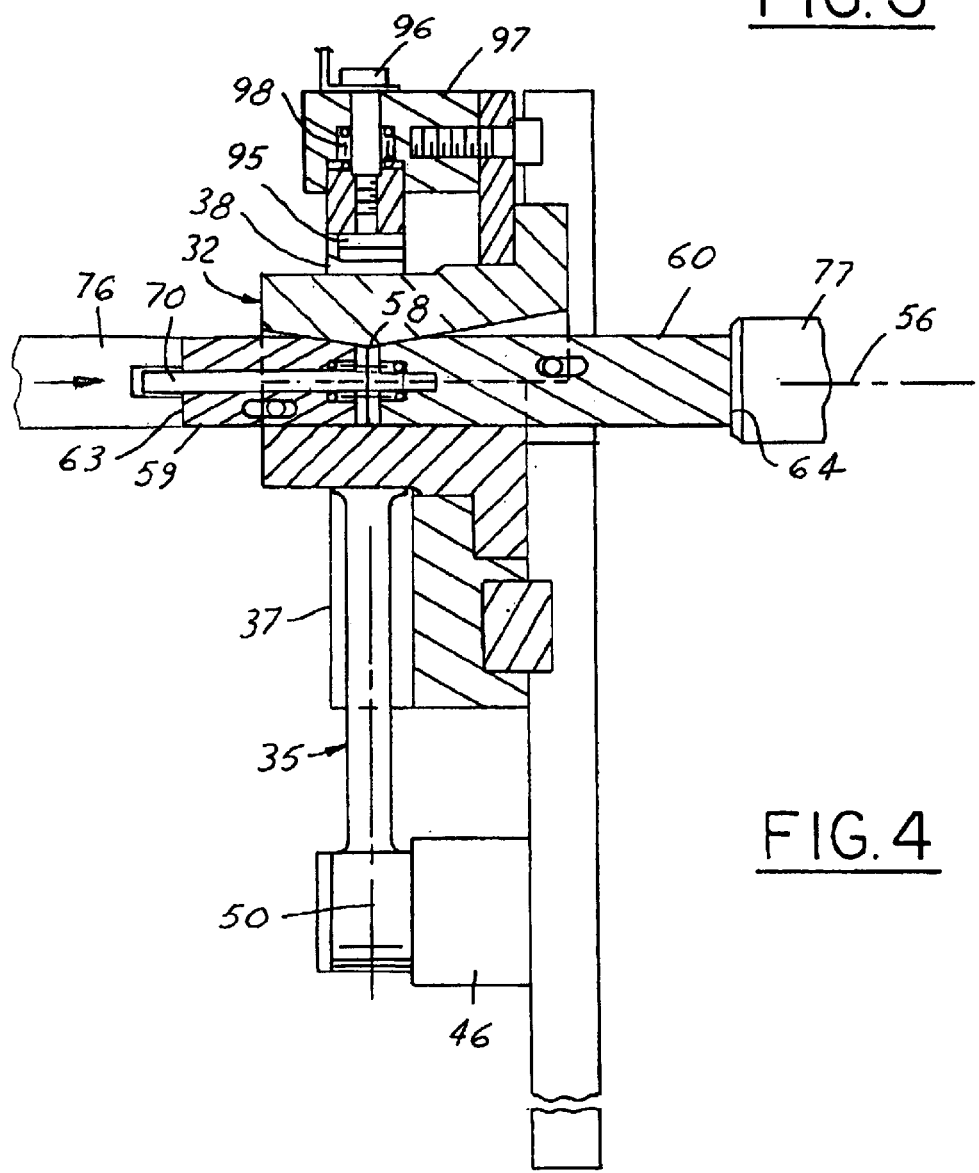
FIG. 4 is a side sectional view of the fixture and connecting rod taken along line 4—4 of FIG. 2.
Figure 4A:
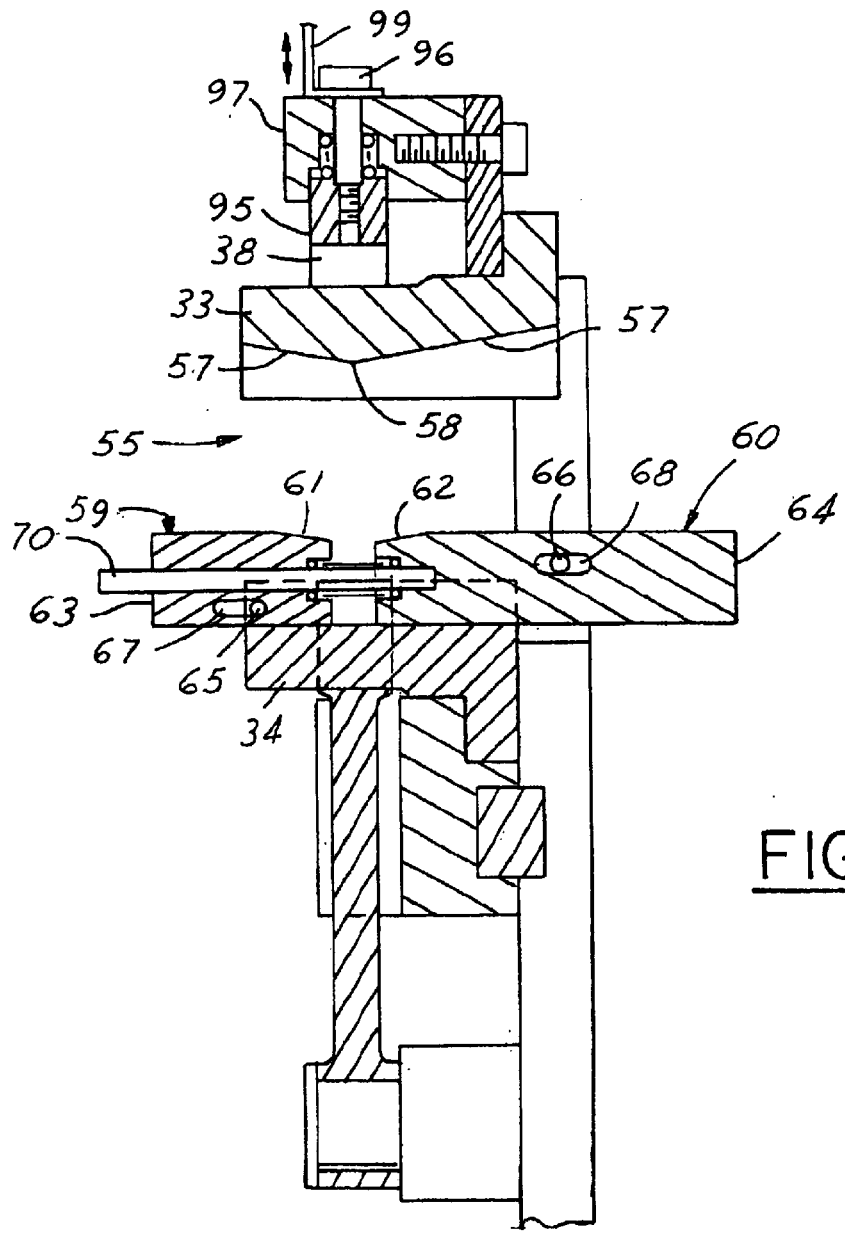
FIG. 4A is a view similar to FIG. 4 but showing the upper mandrel portion and the connecting rod cap in the raised position at the Cleaning Station.
Figure 5:
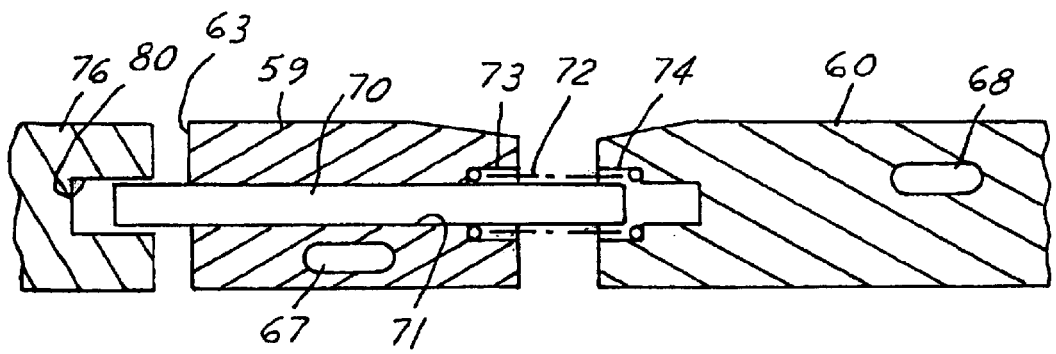
FIG. 5 is a detail view of the wedges that are mounted in the mandrels and are used to crack the big end of the connecting rod.

The upper and lower mandrel portions 33 and 34 are each formed with a generally rectangular slot that together form a passage 55 with horizontal and vertical walls generally in the shape of a square as best shown in FIG. 2. The top wall comprises two inclined portions 56 and 57 that are at an angle of 4 to 10 degrees to the horizontal and meet at a restriction point 58 as best shown in FIG. 4A. The restriction point 58 is positioned so that it is vertically aligned with the central plane 50 of a connecting rod 35 that is mounted on the split mandrel 32.

A pair of movable wedges 59 and 60 fit into the passage 55 through the split mandrel 32 from the front and back of the fixture 13. The bottom and sides of each wedge are straight, but the top of each wedge 59 and 60 is formed with a taper 61 and 62, respectively. The tapers 61 and 62 on the wedges match the inclines on the top walls 56 and 57 of the passage 55. The wedges translate a horizontal force applied by a press ram 76, as described more fully below, into a vertical force that separates the mandrel portions 33 and 34.

The angle of the taper is dependent on the forces needed to crack the rod 35. As the taper decreases, the vertical force that the wedges apply to the split mandrel 32 in response to a horizontal force applied to the ends 63 and 64 of the front and rear wedges 59 and 60, respectively, increases. It has been found that a wedge angle of 7 degrees creates a vertical force on the split mandrel that is 8.2 times the horizontal force that is applied to the ends 63 and 64 of the wedges, and a wedge angle of 5 degrees creates a vertical force on the split mandrel 32 that is 11.5 times the horizontal force that is applied to the ends 63 and 64 of the wedges. The shallow angles on the top surface of each wedge 59 and 60 and on the inclined portions 56 and 57 of the passage 55 are locking angles which hold the wedges in place even after the force of the ram is removed. The locking angles prevent the rod cap 38 from closing and trapping debris against the rod body after the fixture and the cracked rod leave the Cracking Station 2. The length of the two wedges 59 and 60 can be chosen so that their ends abut one another at the end of the cracking stroke to limit the separation gap created by the wedges between the connecting rod cap 38 and the body 37.

Cross pins 65 and 66 mounted in the lower and upper mandrel portions 34 and 33 engage slots 67 and 68, respectively, in the front and back wedges 59 and 60 to keep the wedges from falling out of the passage 55. A knockout pin 70 is positioned in a through hole 71 in the front wedge 59 and a separating spring 72 is mounted in a pair of opposed pockets 73 and 74 formed in the front and rear wedges 59 and 60, respectively.

The shoulder screw 96 that is threaded into the pressure cap 95 can be engaged by a lifting device 99 at the Cleaning Station 3 to raise the upper mandrel 33 and the connecting rod cap 38 in order to clean the crack debris from between the connecting rod cap and body as shown in FIG. 4A. When the lifting device separates the two mandrel portions and the connecting rod cap from the connecting rod body, the separating spring 72 mounted in the opposed pockets 73 and 74 forces the two wedges 59 and 60 apart so that the connecting rod body and cap can be reunited at the Assembly Station 4. In the event both sides of the rod do not crack at the Cracking Station, the knockout pin 70 is used to separate the wedges 59 and 60 so that the mandrel portions 33 and 34 will come back together, allowing the connecting rod body and cap to be removed from the fixture 13.

Figure 6:
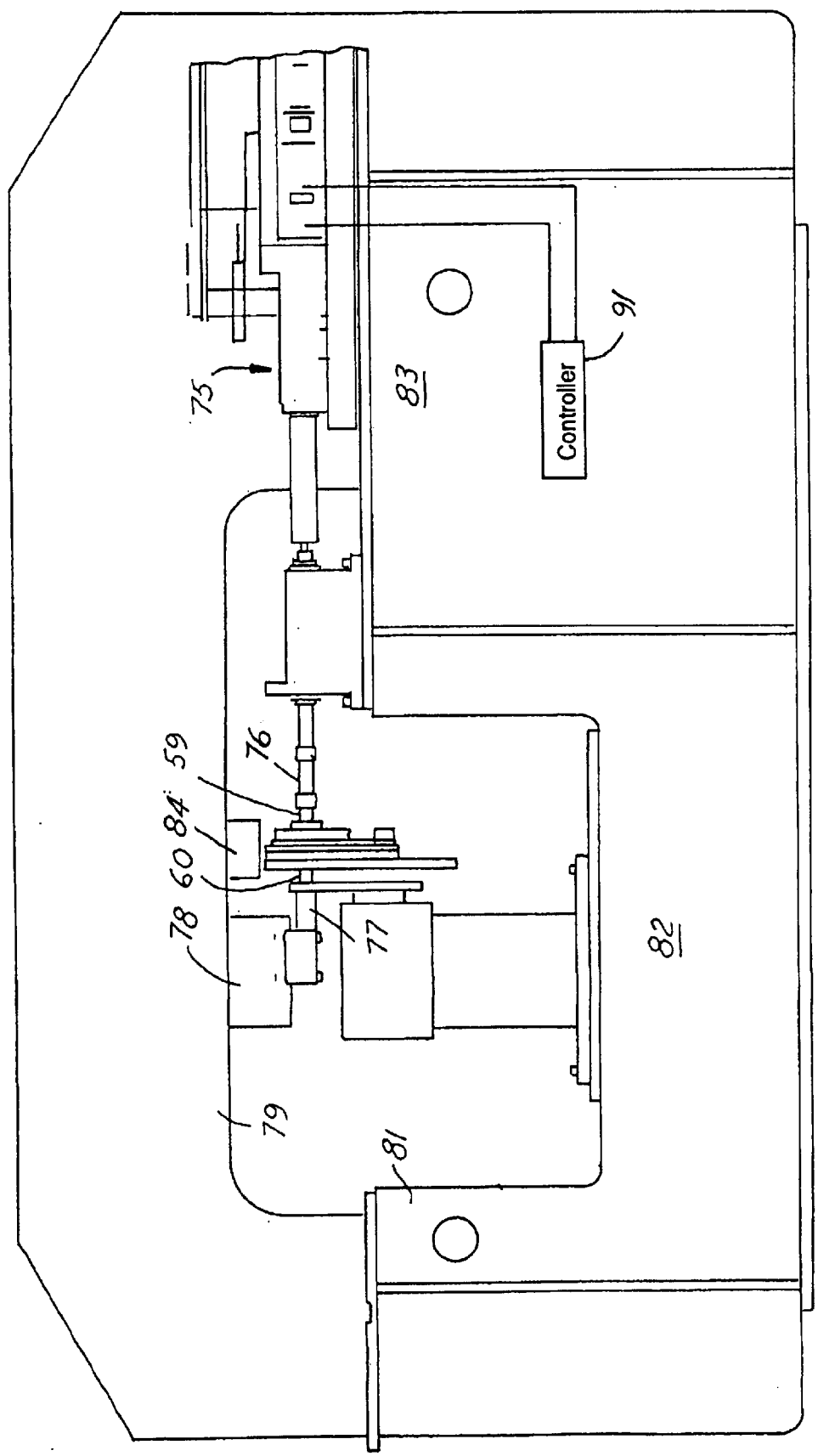
FIG. 6 is a side view of the Cracking Station showing the press ram apparatus used to crack the connecting rod.

FIG. 6 is a side view taken along line 6—6 of FIG. 1 showing the Cracking Station 2. The press ram mechanism includes the press ram actuator 75 and a ram 76. When the fixture 13 is in the cracking station, the ram 76 is in alignment with the front wedge 59 and a back-up anvil 77 is in alignment with the rear wedge 60. The back-up anvil 77 is mounted on an abutment 78 which is rigidly attached to a bridge 79. The bridge 79 extends from the rear portion 81 of the base 82 to the front portion 83 of the base on which the ram actuator 75 is mounted. When a fixture with an uncracked connecting rod is in the Cracking Station 2, the press ram 76 is advanced until it contacts the front wedge 59. A clearance hole 80 in the front of the press ram 76 allows the press ram to engage the end 63 of the front wedge 59 without engaging the knockout pin 70. Further advancement of the press ram 76 causes the wedge 59 to advance into the passageway 55, and the support plate 27 with the split mandrel 32 and the connecting rod 35 mounted thereon to slide rearwardly on the mounting pins 28 until the rear wedge 60 contacts the back-up-anvil 77. The upper mandrel 33 then begins to separate from the lower mandrel 34 causing the connecting rod 35 to stretch and crack. The reaction force of the back-up anvil 77 on the rear wedge 60 allows the wedges 59 and 60 to apply equal and opposite forces to the upper and lower mandrel portions 33 and 34, with the resultant force vector being aligned with the central plane 50 of the connecting rod 35 throughout the cracking process, although only the front wedge has the force of the moving ram 76 applied to it. The press ram actuator 75 is controlled by a controller 91 and operates first at a low pressure level to push the two wedges 59 and 60 toward each other to take out any clearance between the components, and then at a high pressure to force the two wedges 59 and 60 together causing the upper and lower mandrel portions 33 and 34 to separate.

The separating mandrel portions will cause the connecting rod body 37 and cap 38 to crack along pre-defined lines as well known in the art. The use of the two opposing wedges limits the distortion caused by rotational deflection of the connecting rod in the region of the break since bending moments normal to the plane of the connecting rod are eliminated. As the two wedges 59 and 60 approach the restriction point 58 formed in the passage 55, the separating force exerted on the connecting rod bore 36 by the split mandrel 32 will be centered on the vertical central plane 50 of the connecting rod 35.

Normally, one side of the connecting rod will crack before the other side cracks. A break limiter 84 mounted on the bridge 79 is lowered by a lowering mechanism 85 until it is in close proximity to the connecting rod cap 38. In the lowered position, the break limiter 84 limits the vertical upward movement of the first side of the rod to crack, and prevents unwanted pivoting of the cracked side of the cap around the uncracked side of the cap. The break limiter 84 may comprise two pins 86 that are lowered by the lowering mechanism 85 to pass through the clearance holes 87 in the mount 97 for the pressure cap 95 until the ends 90 of the pins are within 0.002 inches to 0.005 inches of the rod cap 38.

In normal operation, the break limiter 84 will limit upward movement of the cap to less than 0.003 inches. Since the break limiter 84 is mounted on the bridge 79 at the Cracking Station 2, the connecting rod cap 38 and the upper mandrel 33 are free to move vertically on the slide plate 29 for downstream operations once the fixture leaves the Cracking Station 2.

As described above, the bridge 59 performs three functions in the operation of the cracking mechanism. The bridge ties the front 83 of the base 82 to the rear 81 of the base to increase the stiffness of the base on which the cracking apparatus is mounted. The bridge provides a rigid support for the backup anvil 77 so that the horizontal forces generated by the ram actuator 75 can be converted by the wedges 59 and 60 into vertical forces that will separate the split mandrel 32 and crack the connecting rod 35. The bridge 59 also provides a rigid support for the break limiter 84 to control the vertical movement of the connecting rod cap 38 after it has been cracked.

Sequence Of Operations

The invention described above is used to separate or crack a connecting rod cap and body according to the following sequence of operations:

1. Advance empty fixture 13 to Loading Station 1;
2. Engage and raise pressure cap 95 to allow connecting rod to be loaded onto fixture;
3. Release pressure cap to bias pressure cap against connecting rod cap 38;
4. Advance fixture to Cracking Station 2;
5. Lower break limiter 84 to within 0.003" of connecting rod cap;
6. Advance press ram 76 at low pressure against front wedge 59 to take out any clearance in the components; the fixture 13 floats on the pins 28 to bring the rear wedge 60 into contact with the backup anvil 77 and to center the cracking force of the split mandrel along the central plane 50 of the connecting rod;
7. Advance press ram at high pressure against the front wedge 59 to crack one side of the connecting rod;
8. Break limiter limits displacement of first side of rod to crack to 0.003";
9. Further advancement of press ram 76 at high pressure cracks second side of connecting rod;
10. Front and rear wedges 59 and 60 meet in center of split mandrel to limit further displacement of split mandrel;
11. Retract press ram and raise break limiter from engagement with fixture;
12. Advance fixture and cracked rod to Cleaning Station 3;
13. Engage and raise pressure cap 95 and upper mandrel portion 33 to create 1"–2" space between connecting rod body and cap; separating spring 72 forces wedges apart;
14. Blow out and vacuum away debris from cracking operation;
15. Lower and release pressure cap and mandrel to bring connecting rod cap into contact with connecting rod body;
16. Advance fixture with cracked connecting rod to Assembly Station 4;
17. Rap on cap to reunite connecting rod cap to body;
18. Advance fixture with reunited cap and body to Bolt Loading Station 5;

19. Load bolts into connecting rod cap and body to loosely secure cap to body;
20. Advance fixture and connecting rod with loaded bolts to Bolt Tightening Station 6;
21. Tighten bolts to correct torque;
22. Advance fixture and connecting rod with torqued bolts to Bushing Station 7;
23. Press bushing into wrist pin hole in small end of connecting rod;
24. Advance fixture with completed connecting rod to Unload Station 8;
25. Remove completed connecting rod from fixture;

Having thus described the invention, various modifications and alterations will occur to those skilled in the art, which modifications and alterations are intended to be within the scope of the invention as defined by the appended claims.

What is claimed is:

1. An apparatus for splitting the connecting rod cap from the big end of a connecting rod comprising the following:
   a conveyor and a plurality of fixtures mounted on the conveyor;
   a plurality of stations located around the conveyor including a connecting rod cracking station, whereby the conveyor transports the fixtures one at a time to the cracking station;
   a bore engaging member on each fixture for engaging the bore of the big end of the connecting rod; and,
   an impact member at the cracking station for causing the bore engaging member to expand, thereby splitting the connecting rod cap from the big end of the connecting rod.

2. The apparatus of claim 1 further comprising:
   a split mandrel comprising the bore engaging member.

3. The apparatus of claim 2 further comprising:
   a pair of wedges positioned in the split mandrel, whereby the impact member at the cracking station acts on the pair of wedges to split the connecting rod cap from the big end of the connecting rod.

4. The apparatus of claim 3 wherein the pair of wedges comprise two wedges that are opposed to one another and create horizontal and vertical forces within the split mandrel, the horizontal forces being equal and opposite and summing to a net zero force, and the vertical forces acting on the split mandrel to separate the mandrel halves, thus splitting the connecting rod cap from the big end of the connecting rod.

5. The apparatus of claim 4 wherein the connecting rod is positioned on the split mandrel and wedges are positioned in the split mandrel so that a vertical plane that is centered between the ends of the two wedges passes through the center of the connecting rod that is mounted on the split mandrel, and wherein the impact member applies an impact force to one of the wedges only, and the other wedge comes into contact with a stationary backup anvil.

6. The apparatus of claim 2 wherein the split mandrel comprises an upper half and a lower half, each half being generally semicircular in shape and closely fitting within the big bore of the connecting rod, the upper half having a generally flat top portion and the lower half having a generally flat bottom portion, the flat top and bottom portions of the mandrel acting to distribute the force of the mandrel on the big bore of the connecting rod by ensuring that the force exerted by each mandrel half is applied to at least two spaced points on the interior surface of the big bore.

7. The apparatus of claim 2 wherein each fixture comprises a support plate that supports the split mandrel and the support plate is movably mounted on a base plate, whereby the support plate is able to move back and forth relative to the base plate in the cracking station so that the support plate can be centered between the impact member.

8. An apparatus for splitting the connecting rod cap from the big end of a connecting rod comprising the following:
   a conveyor and a plurality of fixtures mounted on the conveyor;
   a plurality of stations located around the conveyor including a connecting rod loading station and a connecting rod cracking station, whereby the conveyor transports the fixtures one at a time to the stations;
   a split mandrel on each fixture for engaging the bore of the big end of the connecting rod and a passageway formed between the halves of the split mandrel;
   a pair of opposed wedges positioned in the passageway formed between the halves of the split mandrel; and,
   a break limiter mounted at the cracking station for limiting the separation of the connecting rod cap from the body during the splitting process, whereby the break limiter prevents distortion of the second side of the connecting rod to crack after the first side of the connecting rod has cracked.

9. The apparatus of claim 8 further comprising:
   an impact member at the cracking station for forcing the two wedges together thus causing the halves of the split mandrel to separate, the impact member comprising a press ram actuator, a press ram, and a back-up anvil.

10. The apparatus of claim 9 further comprising:
    a cleaning station comprising one of the plurality of stations, the cleaning station receiving a fixture after the connecting rod carried by the fixture has been through the cracking station;
    a lifting device at the cleaning station for lifting the cracked connecting rod cap from the connecting rod body; and,
    a compressed air and vacuum source at the cleaning station for cleaning debris caused by the cracking operation in the crack zone between the body and cap before the body and cap are reunited.

11. An apparatus for splitting the connecting rod cap from the big end of a connecting rod comprising the following:
    a fixture adapted to receive a connecting rod thereon;
    a bore engaging member on the fixture for engaging the bore of the big end of the connecting rod;
    a wedge member for separating the bore engaging member in order to apply a splitting force to the bore of the big end of the connecting rod;
    a ram and a back-up anvil for applying a compressive force to the wedge member;
    a support plate for supporting the bore engaging member, said support plate being able to move forward and backward to allow the connecting rod to be centered between the ram and the back-up anvil.

12. The apparatus of claim 11 further comprising:
    a location on the fixture for receiving a break limiter device, the break limiter device limiting the separation of the connecting rod cap from the body during the cracking operation.

13. The apparatus of claim 12 further comprising a spring loaded pressure cap mounted on the fixture, the spring loaded pressure cap biasing the connecting rod cap against the split mandrel.

14. The apparatus of claim 12 wherein the break limiter device limits the separation between the connecting rod and cap to less than 0.010 inches.

15. The apparatus of claim 11 further comprising:
   lateral motion restrictors on the fixture for engaging the small end of the connecting rod, the lateral motion restrictors preventing the small end of the connecting rod from swaying while the connecting rod is mounted on the fixture.

16. The apparatus of claim 11 further comprising:
   a split mandrel comprising the bore engaging member and a passage formed between the halves of the split mandrel;
   inclined walls forming the top wall of the passage, the angle of the inclined walls being at approximately the same angle as the angle formed on the wedges.

17. The apparatus of claim 16 wherein the angle formed on the wedges is a locking angle that keeps the wedges in place in the passageway after the compressive force of the ram and back-up anvil has been removed from the wedges.

18. The apparatus of claim 17 wherein the angle formed on the wedges is between 3 and 10 degrees.

19. The apparatus of claim 16 further comprising:
   a restriction point in the passage where the inclined walls meet, the restriction point being in the same plane as the central plane of a connecting rod that is mounted on the split mandrel.

20. The apparatus of claim 11 wherein the ram is powered by a ram actuator and the ram actuator is controlled to first advance the ram at a low pressure to remove any clearances between the ram, the wedges, the passageway, and the back-up anvil, and then to advance the ram at high pressure to separate the split mandrel and crack the connecting rod cap from the connecting rod body.

* * * * *

UNITED STATES PATENT AND TRADEMARK OFFICE
CERTIFICATE OF CORRECTION

PATENT NO. : 6,782,609 B1  
DATED : August 31, 2004  
INVENTOR(S) : Beggs

Page 1 of 1

It is certified that error appears in the above-identified patent and that said Letters Patent is hereby corrected as shown below:

Column 1,
Line 25, after "then" insert therein -- be --

Column 4,
Line 12, after "pull the" delete "side" and insert therein -- slide --

Column 6,
Line 9, after "the bridge" delete "59" and insert therein -- 79 --
Line 16, after "bridge" delete "59" and insert therein -- 79 --

Column 8,
Line 54, after "member;" insert therein -- and --

Signed and Sealed this

Twenty-second Day of February, 2005

JON W. DUDAS  
*Director of the United States Patent and Trademark Office*